United States Patent [19]

Ehrhart et al.

[11] Patent Number: 4,531,349
[45] Date of Patent: Jul. 30, 1985

[54] ROTARY CUTTER FOR DISC MOWER-CONDITIONER

[75] Inventors: Philip J. Ehrhart, Narvon; Stanley J. Makofka; Kenneth W. McLean, both of New Holland, all of Pa.

[73] Assignee: Sperry Corporation, New Holland, Pa.

[21] Appl. No.: 592,643

[22] Filed: Mar. 23, 1984

[51] Int. Cl.³ ............... A01D 55/18; A01D 35/264
[52] U.S. Cl. ............................ 56/13.6; 56/6; 56/295
[58] Field of Search ............ 56/6, 13.6, 295, 192, 56/116.1

[56] References Cited

U.S. PATENT DOCUMENTS

| 3,555,798 | 1/1971 | Eder | 56/295 |
| 3,662,530 | 5/1972 | Henriksen | 56/295 |
| 3,905,182 | 9/1975 | Geier | 56/13.6 |
| 4,099,369 | 7/1978 | Oosterling et al. | 56/295 |
| 4,103,476 | 8/1978 | Oosterling et al. | 56/295 |
| 4,110,959 | 9/1978 | Oosterling et al. | 56/6 |
| 4,177,625 | 12/1979 | Knight et al. | 56/DIG. 1 |
| 4,185,445 | 1/1980 | van der Lely | 56/6 |
| 4,304,088 | 12/1981 | Werner | 56/13.6 |

FOREIGN PATENT DOCUMENTS

| 2282216 | 3/1976 | France | 56/13.6 |
| 1326900 | 8/1973 | United Kingdom | 56/295 |
| 2058536 | 4/1981 | United Kingdom | 56/13.7 |

Primary Examiner—Paul J. Hirsch
Attorney, Agent, or Firm—Larry W. Miller; Frank A. Seemar; Darrell F. Marquette

[57] ABSTRACT

A disc mower-conditioner having a disc cutterbar with transversely spaced rotatable disc cutters to sever standing crop material by an impact action and a rotatable conditioning mechanism mounted rearwardly of the cutterbar to receive and condition severed crop material is disclosed wherein each disc cutter member is provided with a crop lifting ramp portion adjacent the peripheral edge of the disc cutter adjacent each knife in both leading and trailing relationships thereto. The inclined ramp portions are operable to lift previously severed crop material away from the corresponding knife before the knife severs standing crop material and to feed the severed crop material into the conditioning mechanism. The inclined ramp portions are provided on both sides of the knives to permit the disc cutter member to be rotatable in either clockwise or counterclockwise directions and still provide a leading crop lifting action. The leading inclined ramp portions can be provided with replaceable wear members to extend the operative life of the disc cutter member.

20 Claims, 24 Drawing Figures

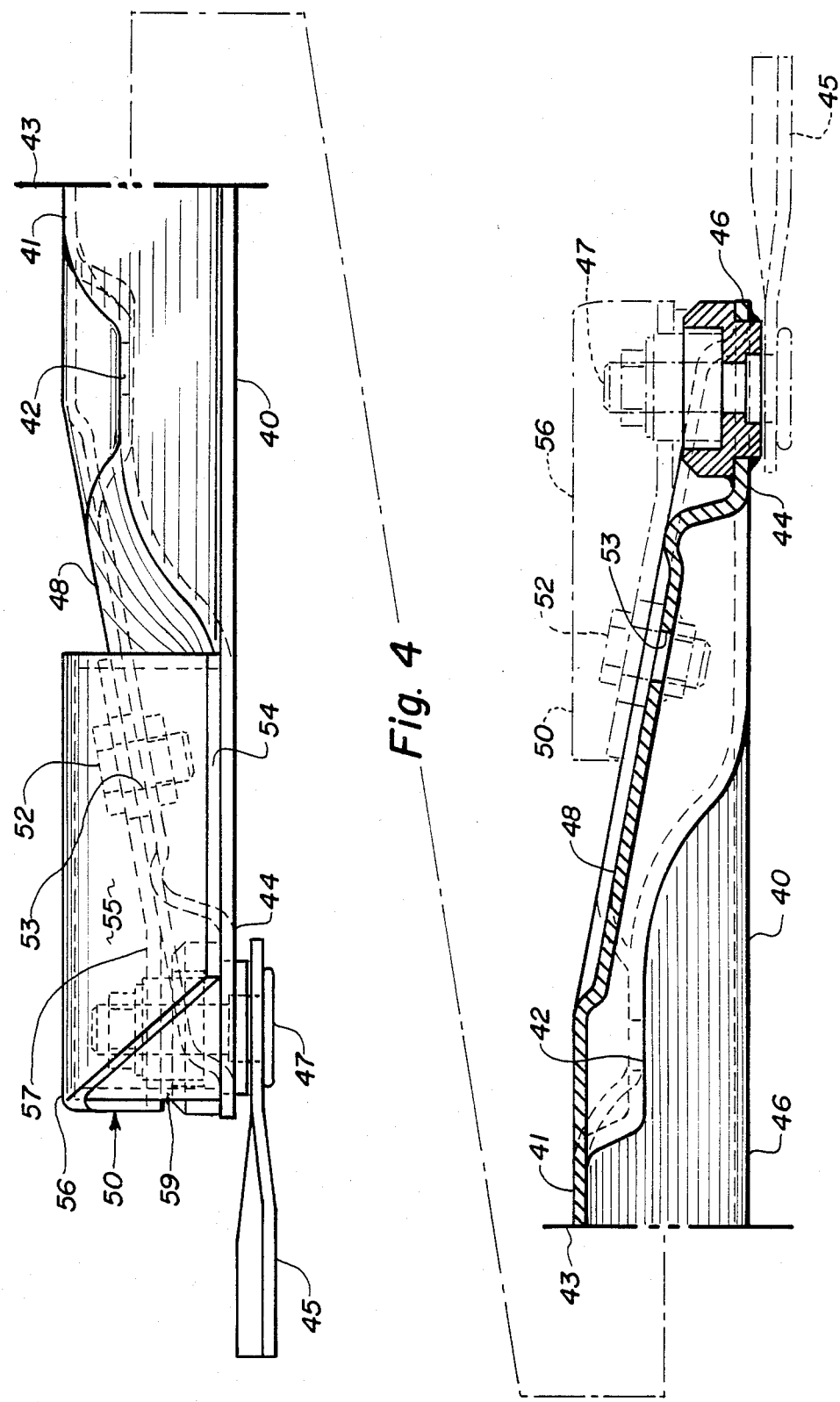

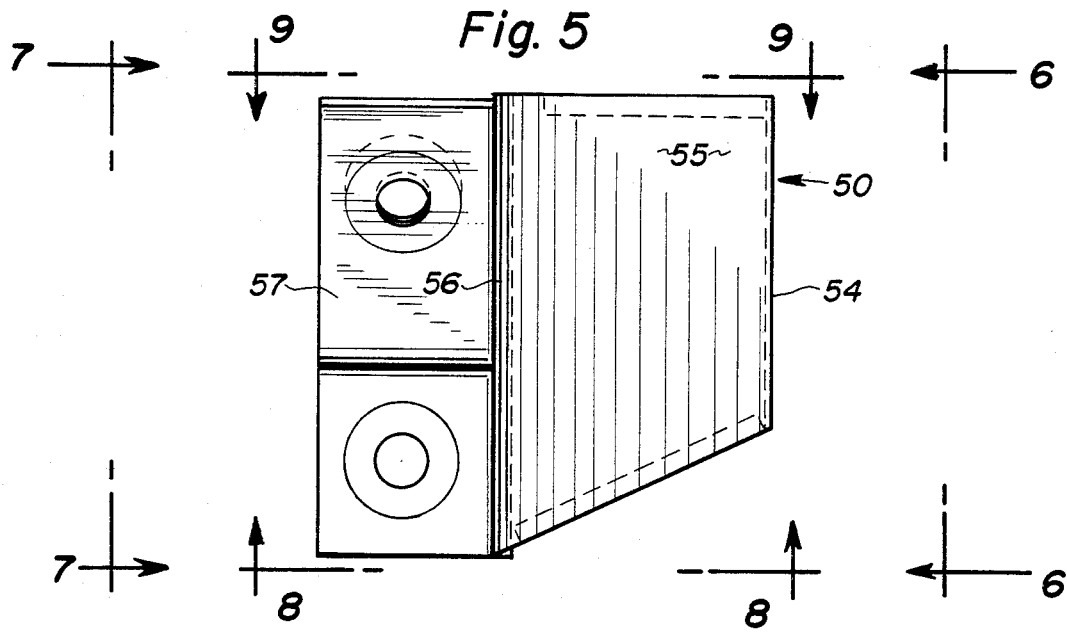
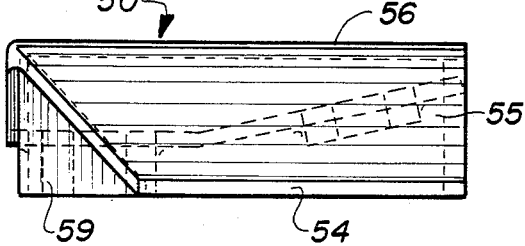
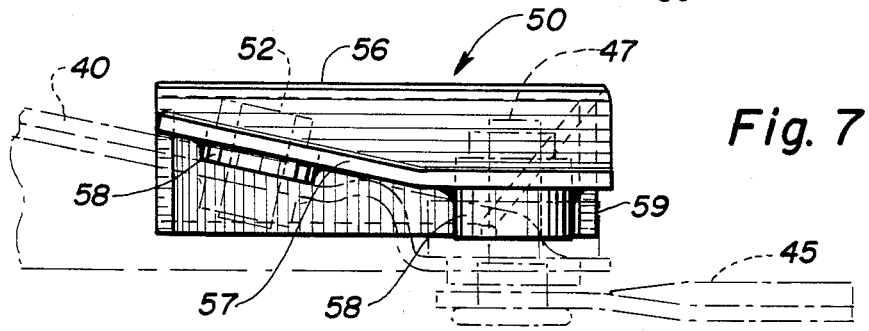
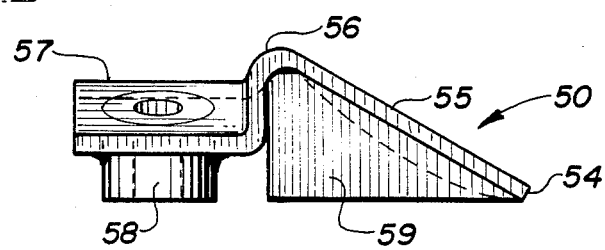
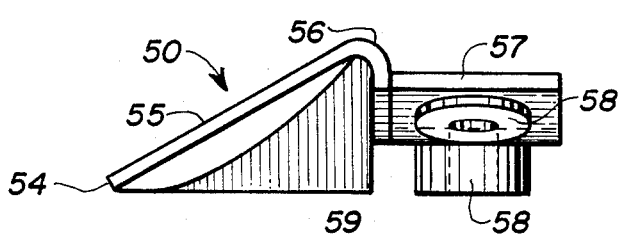

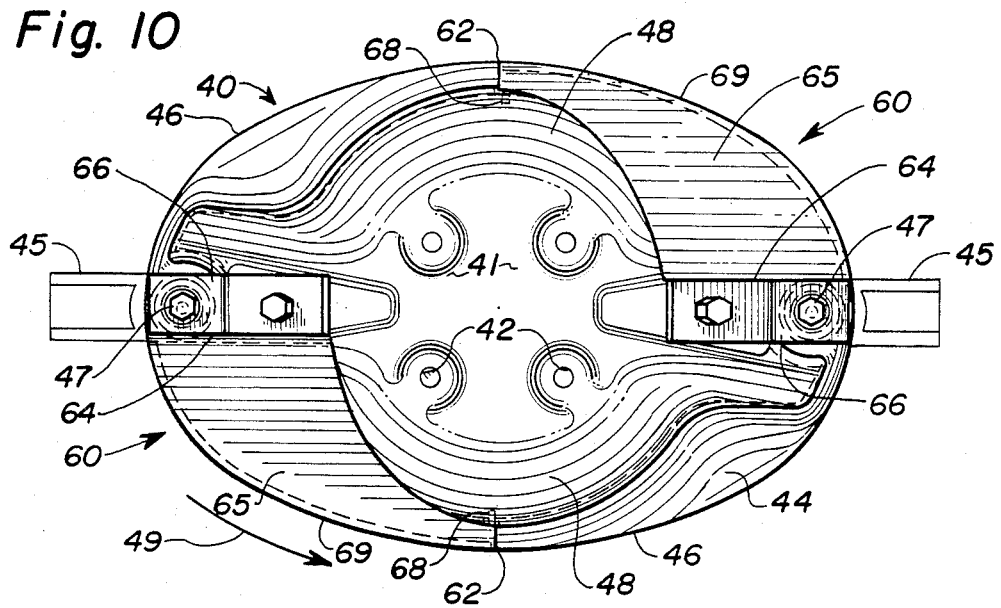
Fig. 10
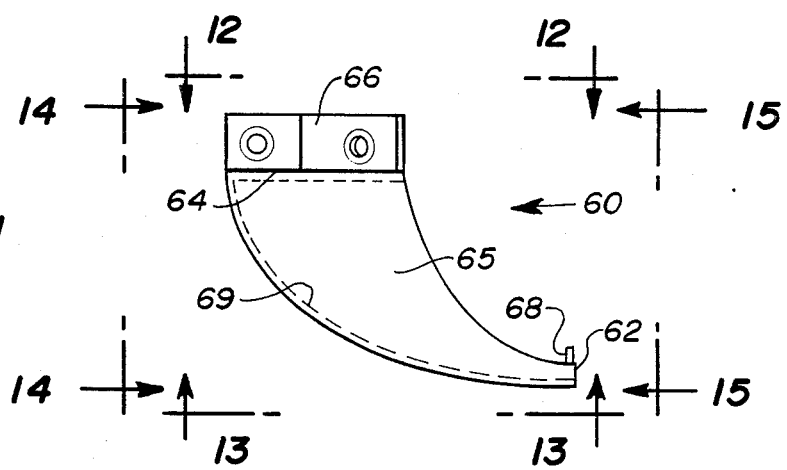
Fig. 11
Fig. 12
Fig. 13
Fig. 14
Fig. 15

ROTARY CUTTER FOR DISC MOWER-CONDITIONER

BACKGROUND OF THE INVENTION

The present invention relates generally to disc mower-conditioners, and more particularly, to an improved disc cutter member for use on the cutterbar of a disc mower-conditioner.

Mower-conditioners have been provided for a number of years to sever standing crop material and convey the severed crop material rearwardly into a conditioning mechanism without depositing the severed crop upon the ground. A disc mower-conditioner utilizes a disc cutterbar having a number of transversely spaced disc cutter members rotatable to sever standing crop material by an impact action. A conditioning mechanism is mounted rearwardly of the disc cutterbar to receive the severed crop material directly from the disc cutter units without need of an intermediate crop conveying mechanism.

It has been found that certain crops, such as oats, rye, bluegrass and sorghum-sudan hybrids, when harvested by a disc mower-conditioner, have a tendency for severed crop material to build up in front of the disc cutters after being severed, resulting in a laying down of uncut crop material before it can be severed by the disc cutters. Under these conditions, the crop material being cut leaves a long stubble. In addition, certain crops have a tendency to feed under the lower conditioning roll after being servered and, thereby, escape the conditioning treatment. Assistance in feeding severed crop into the conditioning mechanism is desirable. Furthermore, the rapid rotation of the disc cutters creates a high rate of wear under abrasive crop and/or soil conditions, subjecting the hardware detachably connecting the knives to the disc cutters to a great amount of wear, requiring frequent replacement of the knife fastening hardware.

The addition of crop lifters to presently existing disc cutter members to solve the above-noted problems can create problems of their own. The additional weight of the crop lifters causes operational problems with the bearings rotatably supporting the individual disc cutters, particularly if the crop lifters are not properly balanced about the axis of rotation. Furthermore, means for attaching the crop lifters to the disc cutters must be provided, adding still further weight to the disc cutter members. On the other hand, if the lifters are welded onto the disc cutters, the disc cannot be utilized at a counter-rotating position, unless further lifters are welded onto the disc, resulting in limited utilization of the disc.

SUMMARY OF THE INVENTION

It is an object of this invention to overcome the aforementioned disadvantages of the prior art by providing a disc cutter member having inclined ramp lifters integrally formed into the disc.

It is another object of this invention to provide a disc cutter member having built in wear protection for the knife mounting hardware.

It is a feature of this invention to provide a disc cutter member with inclined ramp portions serving as crop lifters.

It is an advantage of this invention that a disc cutter member can be provided with inclined ramp lifters without adding additional weight to the disc.

It is another advantage of this invention that the disc cutter member can be rotated to provide a crop lifting function in either clockwise or counterclockwise directions.

It is still another advantage of this invention that a disc cutter member can be provided with lifters without unbalancing the disc for rotation about the axis of rotation.

It is still another object of this invention to provide a disc cutter member with inclined ramp lifters that is lightweight and has a long operative life.

It is another feature of this invention that the disc cutter member can be equipped with ear plates covering the leading inclined ramp portions.

It is a further advantage of this invention that the wear plates can be detachably affixed to the disc cutter member.

It is yet another object of this invention to provide a disc cutter member that will improve the feeding of severed crop material to the conditioning mechanism in a disc mower-conditioner.

It is still another feature of this invention that the severed crop material does not leave a long stubble.

It is yet a further advantage of this invention that the harvesting efficiency of a disc mower-conditioner is increased.

It is a further object of this invention to provide a disc cutter member having integrally formed inclined ramp portions for a disc mower-conditioner that is durable in construction, inexpensive of manufacture, carefree of maintenance, facile in assemblage, and simple and effective in use.

These and other objects, features and advantages are accomplished according to the instant invention by providing a disc mower-conditioner having a disc cutterbar with transversely spaced rotatable disc cutters to sever standing crop material by an impact action and a rotatable conditioning mechanism mounted rearwardly of the cutterbar to receive and condition severed crop material wherein each disc cutter member is provided with a crop lifting ramp portion adjacent the peripheral edge of the disc cutter proximate to each knife in both leading and trailing relation thereto. The inclined ramp portions are operable to lift previously severed crop material away from the corresponding knife before the knife severs standing crop material and to feed the severed crop material into the conditioning mechanism. The inclined ramp portions are provided on both sides of the knives to permit the disc cutter member to be rotatable in either clockwise or counterclockwise directions and still provide a leading crop lifting action. The leading inclined ramp portions can be provided with replaceable wear members to extend the operative life of the disc cutter member.

BRIEF DESCRIPTION OF THE DRAWINGS

The advantages of this invention will become apparent upon consideration of the following detailed disclosure of the invention, especially when taken in conjunction with the following drawings wherein:

FIG. 4 is an enlarged cross-sectional view of the disc cutter member seen in FIG. 3, taken along lines 4—4, the view of the disc member being split at the axis of rotation to better show the details of construction;

FIG. 5 is an enlarged top plan detail view of the crop lifter seen in FIGS. 3 and 4;

FIG. 6 is a leading side elevational view of the crop lifter corresponding to lines 6—6 of FIG. 5;

FIG. 7 is a trailing side elevational view of the crop lifter taken along lines 7—7 of FIG. 5, the corresponding portions of the disc cutter member, the knife and attaching hardware being shown in phantom;

FIG. 8 is a peripheral side elevational view of the crop lifter taken along lines 8—8 of FIG. 5;

FIG. 9 is a radially inward side elevational view of the crop lifter corresponding to lines 9—9 of FIG. 5;

FIG. 10 is a top plan view of a disc cutter member, similar to the view seen in FIG. 3, but being provided with an alternative crop lifter embodiment;

FIG. 11 is a top plan view of the crop lifter seen in FIG. 10;

FIG. 12 is a trailing side elevational view of the crop lifter corresponding to lines 12—12 of FIG. 11;

FIG. 13 is a leading side elevational view of the crop lifter corresponding to lines 13—13 of FIG. 11;

FIG. 14 is a peripheral side elevational view of the crop lifter corresponding to lines 14—14 of FIG. 11;

FIG. 15 is a radially inward side elevational view of the crop lifter corresponding to lines 15—15 of FIG. 11;

DETAILED DESCRIPTION OF THE PREFERRED EMBODIMENT

Figure 1:
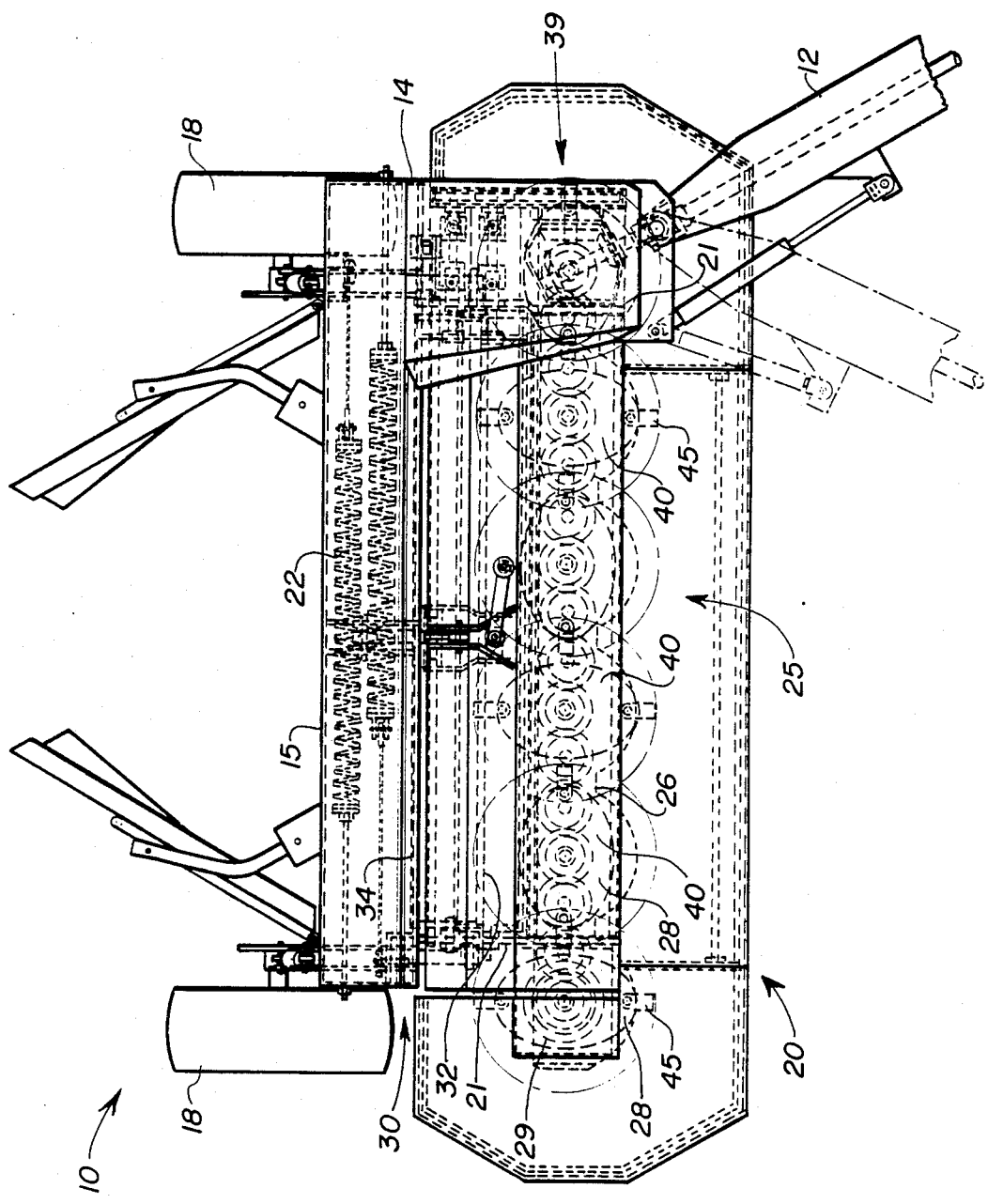
FIG. 1 is a top plan view of a disc mower-conditoner incorporating the principles of the instant invention, a portion of the draft member being broken away.

Referring now to the drawings, and particularly to FIG. 1, a top plan view of a hay harvesting machine, commonly referred to as a disc mower-conditioner can be seen. Any left and right references are used as a matter of convenience and are determined by standing at the rear of the mower-conditioner, facing the forward end, the direction of travel. The mower-conditioner 10 is shown in the form of a pull-type machine having a draft member 12 pivotably connected to the frame 14 of the machine 10. The frame 14 includes a main transverse support beam 15 to which are connected downwardly depending legs 17 mounting wheels 18 for mobilely supporting the machine 10 over the ground G, as best seen in FIG. 2.

Figure 2:
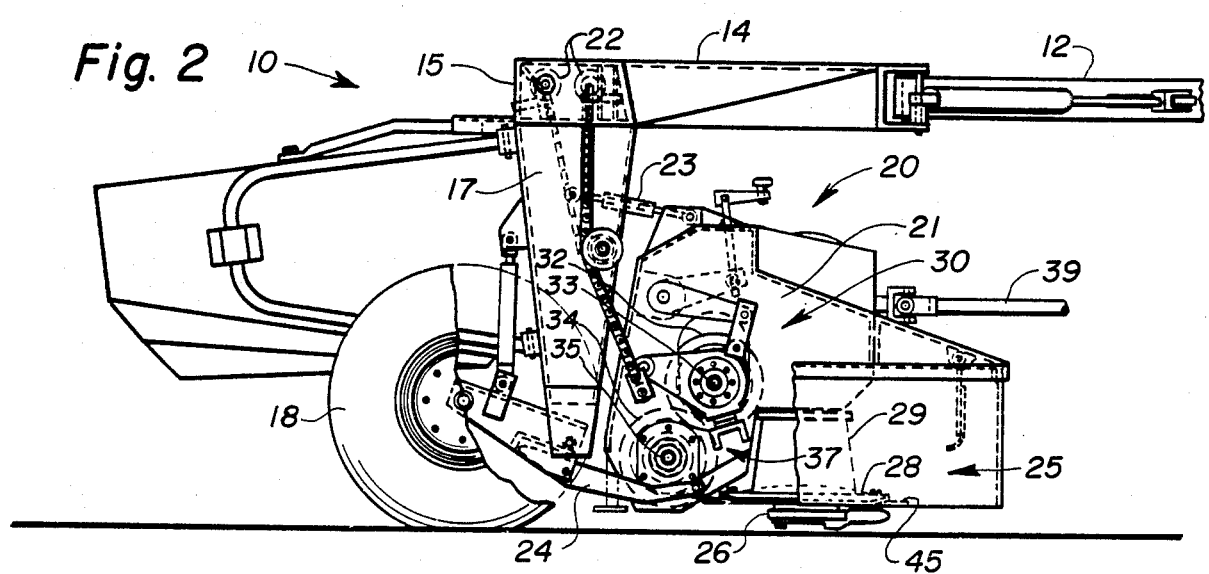
FIG. 2 is a side elevational view of the disc mower-conditioner seen in FIG. 1 with portions being broken away to better show the environment of the invention.

Referring to FIGS. 1 and 2, the mower-conditioner 10 includes a crop harvesting header 20 floatingly supported for movement with the ground G relative to the frame 14 by the counter balancing mechanism 22 and upper and lower links 23,24 interconnecting the header 20 and the frame 14. The header 20 is provided with a crop cutting mechanism 25, seen in the form of a disc cutterbar 26, such as a Kuhn three meter, six rotor rotary cutterbar, having a plurality of transversely spaced disc cutter members 28 operable to sever standing crop material by an impact action. A conditioning mechanism 30 is mounted in the header 20 rearwardly of the cutting mechanism 25 to receive and condition crop material severed by the cutterbar 26.

The conditioning mechanism 30 included a pair of cooperable, generally vertically spaced transverse conditioning rolls 32,34 operable to condition severed crop material passing therebetween. Each roll 32,34 is rotatably supported between the header side sheets 21 such that the axis of rotation 33 of the upper conditioning roll 32 is spaced slightly forwardly of the axis of rotation 35 of the lower conditioning roll 34, so that the nip 37 formed therebetween is facing slightly downwardly toward the disc cutterbar 26. The preferred embodiment of the conditioning roll construction shown in FIGS. 1 and 2 is of the intermeshing lug design. A conventional drive mechanism 39 provides a source of rotational power to both the disc cutterbar 26 and the conditioning mechanism 30.

Figure 3:
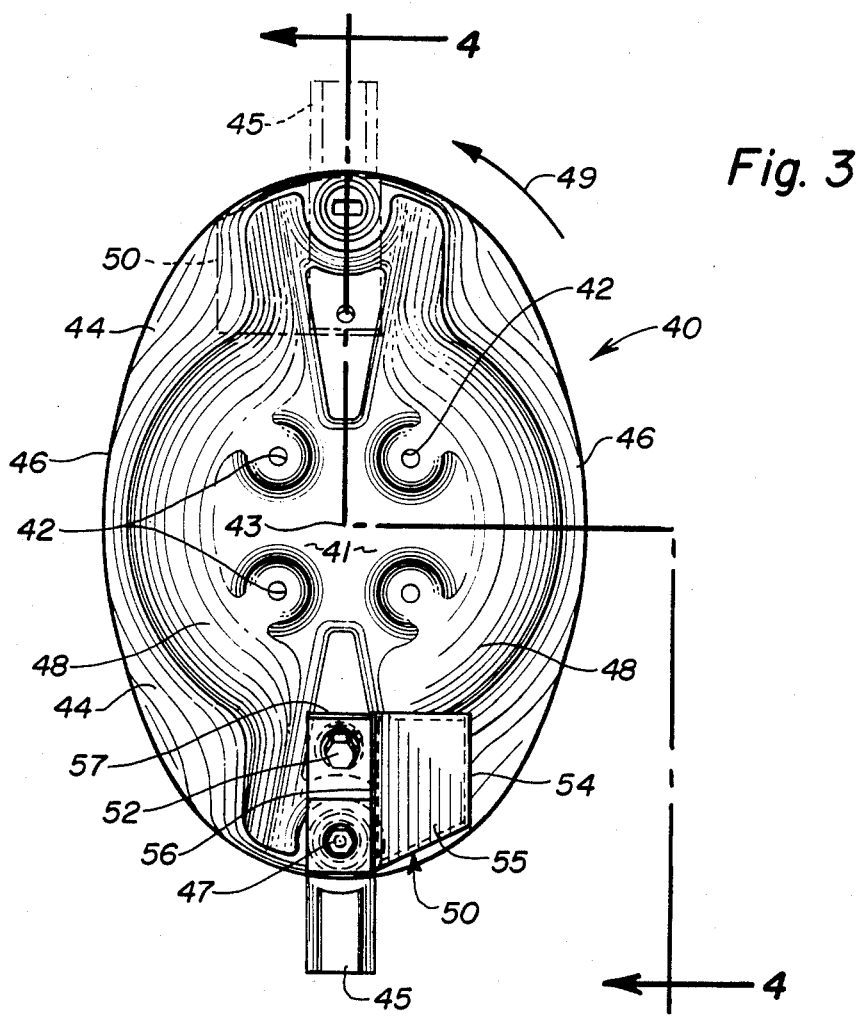
FIG. 3 is an enlarged top plan view of a disc cutter member having one crop lifter and knife attached thereto, the opposing crop lifter and knife being shown in phantom.

Referring now to FIGS. 3 and 4, the disc cutter members 28 can best be seen. Although the transversely opposed endmost disc cutter members 28, as best seen in FIGS. 1 and 2, are provided with a truncated cone 29 to provide a more aggressive crop conveying action, each of the remaining interior disc cutters 40 will have a construction as shown in FIGS. 3 and 4. Each disc member 40 includes a raised central portion 41 in which are formed recessed mounting holes 42 for connection of the disc 40 to a driving member (not shown) in a conventional manner. The axis of rotation 43 of the disc cutter 40 is positioned in the center of the raised central portion 41. The disc cutter member 40 also includes a lower peripheral portion 44 terminating in a peripheral edge 46 extending around the circumference of the oval shaped disc member 40.

Each disc cutter 40 is provided with a pair of diametrically opposed knives 45 detachably connected to the peripheral portion 44 by fasteners 47. Upon rotation of the disc cutter 40, the knives 45 sever standing crop material by an impact action. The disc member 40 also includes an intermediate sloped portion 48 interconnecting the raised central portion 41 and the lower peripheral portion 44. A crop lifter 50 is shown in FIGS. 3 and 4 as attached to the peripheral portion 44 of the disc member 40 adjacent to each knife 45 and in leading relationship thereto, when viewed in the direction of rotation of the disc member 40, indicated by the arrow 49. The crop lifter 50 is detachably connected to the disc member 40 by the knife fastener 47 and a second fastener 52 extending through an opening 53 in the intermediate sloped portion 48 of the disc member 40.

Referring now to FIGS. 3-9, the details of the crop lifter 50 can best be seen. The crop lifter 50 includes a lower leading edge 54 and a raised trailing edge 56 interconnected by an inclined ramp portion 55. A recessed connecting portion 57 is affixed to the trailing edge 56 to provide a means for connecting the lifter 50 to the disc member 40. As is best seen in FIGS. 4 and 7, the connecting portion 57 is shaped to correspond to the peripheral and intermediate sloped portions 44,48 of the disc member 40 to which the lifter 50 is attached. The connecting portion 57 is recessed sufficiently below the trailing edge 56 to permit the connecting hardware 47,52 to be protected behind the crop lifter 50. The connecting portion 57 is provided with spacers 58 to facilitate a tight mounting connection of the lifter 50 onto the disc member 40. Along the peripheral edge of the lifter 50, the inclined ramp portion 55 is provided with an apron 59 extending circumferentially from the leading edge 54 to the trailing edge 56 and vertically from the inclined ramp portion 55 downwardly to the lower peripheral portion 44 of the disc member 40. The purpose of the apron 59 is to lend rigidity and support to the inclined ramp portion 55 and to prevent a buildup of debris between the lifter 50 and the disc member 40.

As best seen in FIG. 4, the height of the trailing edge 56 of the lifter 50 is in approximately the same plane as the height of the raised central portion 41 of the disc member 40. The positioning of the lifter 50 in leading relationship to the corresponding knife 45 permits the lifter 50 to protect the mounting hardware 47 for the knife 45 from abrasive wear. The inclined ramp portion 55 provides an aggressive lifting action to previously severed crop material to lift such material from the immediately trailing cutting zone for the corresponding knife 45. This lifting action helps prevent severed crop material from passing beneath the conditioning mechanism 30 and also helps to feed the severerd crop material into the nip 37 of the conditioning rolls 32,34 to effect a conditioning thereof. One skilled in the art will readily realize that the lifter 50 will be subject to abrasive wear from the typical cutting conditions in which rotary cutterbars are normally used; however, the detachably connected lifter 50 can easily be replaced to extend the operative life of the more expensive disc member 40. The replacement of the lifter 50 can be accomplished at a significant cost savings when compared to a replacement of the entire disc member 40.

Referring now to FIGS. 10-15, a second crop lifter embodiment 60 can be seen. The crop lifter 60 is somewhat similar to the embodiment shown in FIGS. 3-9. The lifter 60 includes a leading edge 62, a trailing edge 64, and an inclined ramp 65 interconnecting the leading and trailing edges 62,64. A recessed connecting portion 66 with appropriate spacers 67 detachably connect the trailing edge 64 of the lifter 60 to the lower and intermediate sloped portions 44,48 of the disc member 40 with the connecting hardware 47,52. The leading edge 62 of the lifter 60 is provided with a restraining pin 68 engageable with a corresponding opening appropriately positioned within the intermediate sloped portion 48. The restraining pin 68 restricts the movement of the leading edge 62 and helps locate the position of the lifter 60 relative to peripheral edge 46 of the disc member 40.

The inclined ramp 65 extends for substantially an entire quadrant of the peripheral portion 44 of the disc member 40, such that the orientation of the leading edge 62 is disposed at approximately 90 degrees to the orientation of the trailing edge 64. The width of the inclined ramp 65 increases from the leading edge 62 to the trailing edge 64, creating a pork-chop-like shape. This longer, gradually sloping ramp 65 provides a more gradual lifting of the severed crop material, to create a less aggressive crop lifting action than will be obtained from the crop lifter 50 described above. The provision of the peripheral apron 69 extending circumferentially from the leading edge 62 to the trailing edge 64 and vertically between the inclined ramp 65 and the peripheral edge 46 of the disc cutter 40 lends support to the inclined ramp 65 and prevents the entrance of crop material and/or other debris into the cavity formed between the inclined ramp 65 and the disc member 40. As with the lifter 50, the highest point of the lifter 60 is at the trailing edge 64, which preferably should extend to substantially the same plane as the raised central portion 41. The connecting portion 66 is recessed sufficiently to permit the raised trailing edge 64 to protect the connecting hardware 47,52.

Figure 16:
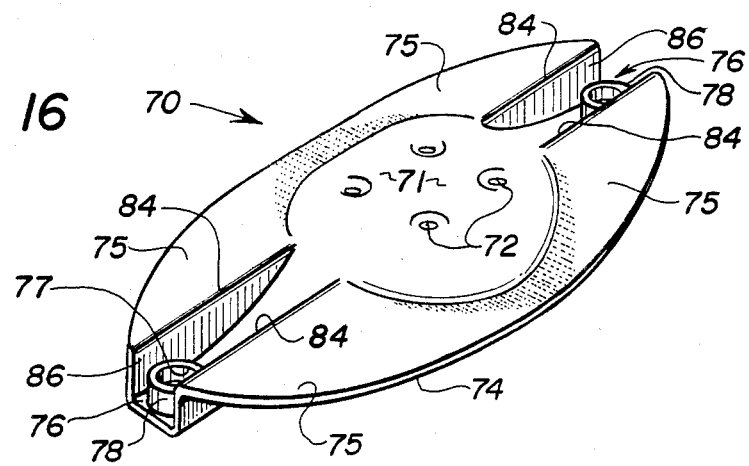
FIG. 16 is a perspective view of a disc cutter member integrally incorporating crop lifting ramp portions.
Figure 17:
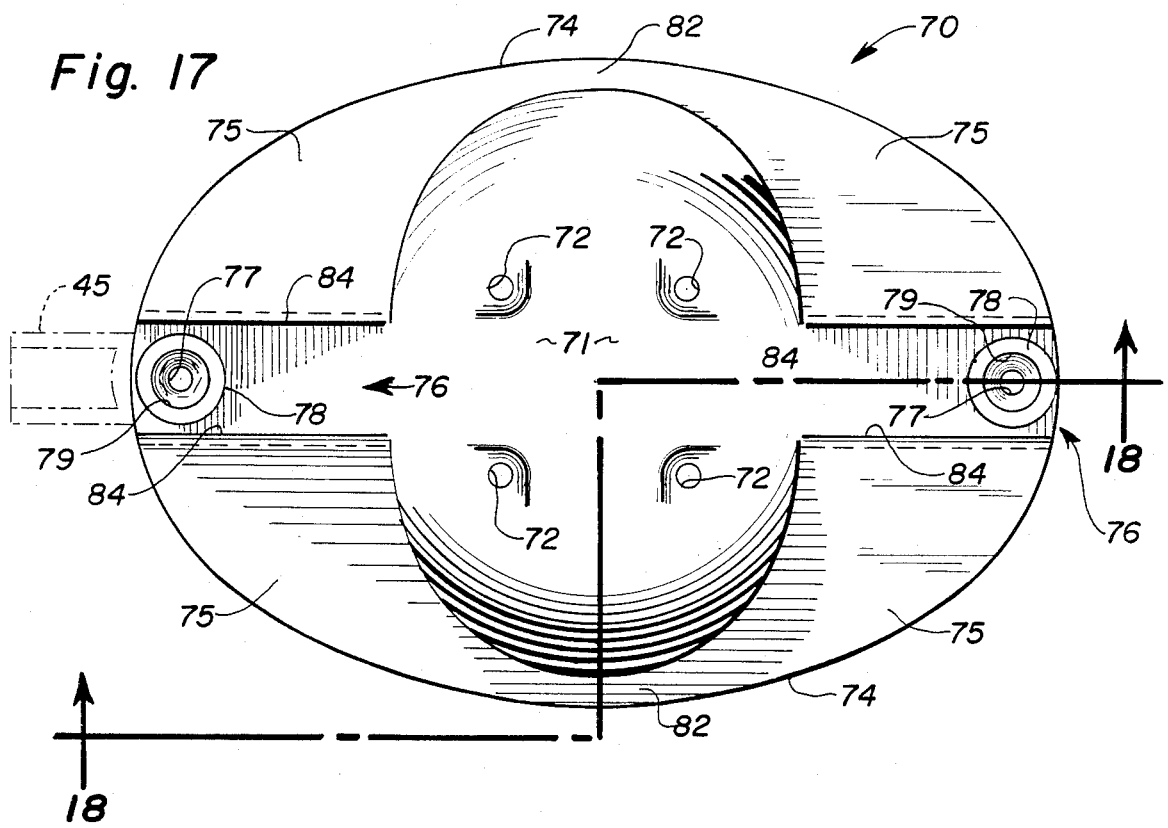
FIG. 17 is an enlarged top plan view of the disc cutter member seen in FIG. 16, the position of one of the knives being shown in phantom.
Figure 18:
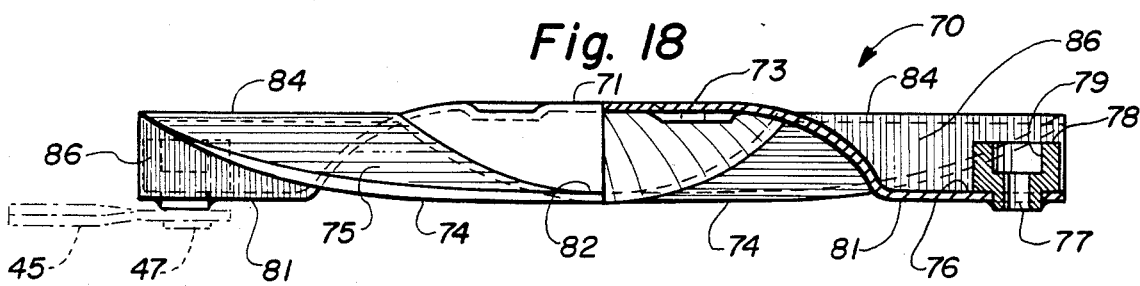
FIG. 18 is a cross-sectional view of the disc cutter member seen in FIG. 17 taken along lines 18—18.

Referring now to FIGS. 16-18, a new disc cutter member 70 integrally incorporating lifting ramps 75 can be seen. The central portion 71 corresponding to the axis of rotation of the disc member 70 is raised and is provided with recessed mounting holes 72 for conventional attachment to a driving member (not shown). The oval-shaped disc member 70 is defined by a circumferential peripheral edge 74. Circumferentially opposed along the major axis of the oval-shaped disc member 70 are knife mounting holes 77 formed in a lower trench-like portion 76 defining a bottom plane 81 of the disc member 70 disposed below an upper plane 73 defined by the raised central portion 71. The knife mounting holes 77 are provided with protection collars 78 having a countersunk opening 79 formed therein to provide greater protection for the knife mounting hardware 47.

The disc member 70 is provided with a lower peripheral portion 82 at circumferentailly opposed positions along the minor axis of the disc member 70. The lower peripheral portions 82 are displaced 90 degrees around the circumference 74 of the disc member 70 from the knife mounting hole 77. The lower peripheral portions 82 are positioned in the bottom plane 81 with the trench portion 76. From each lower peripheral portion 82, an inclined ramp 75 extends toward each knife mounting hole 77. Each inclined ramp 75 terminates in a raised trailing edge 84 extending to or near the upper plane 73 defined by the raised central portion 71. The trailing edges 84 can be positioned slightly below the upper plane 73 to accommodate the attachment of wear plates 90, as will be described in further detail below with respect to FIGS. 19-24.

The vertical sides 86 extend from the trailing edges 84 downwardly to the lower trench portion 76, thereby defining the sides of the trench portion 76, to lend additional protection to the knife hardware 47. Since the disc member 70 is provided with four opposingly directed lifting ramps 75, one skilled in the art will readily realize that the disc member 70 can be mounted on the cutterbar 26 for rotation in either the clockwise or counterclockwise directions during operation. With the lifting ramps 75 extending for substantially an entire quadrant of the peripheral edge of the disc member 70, the disc member 70 will impart a gentle, less aggressive action to the severed crop material to clear the cutting path for the associated knife 45.

Figure 19:
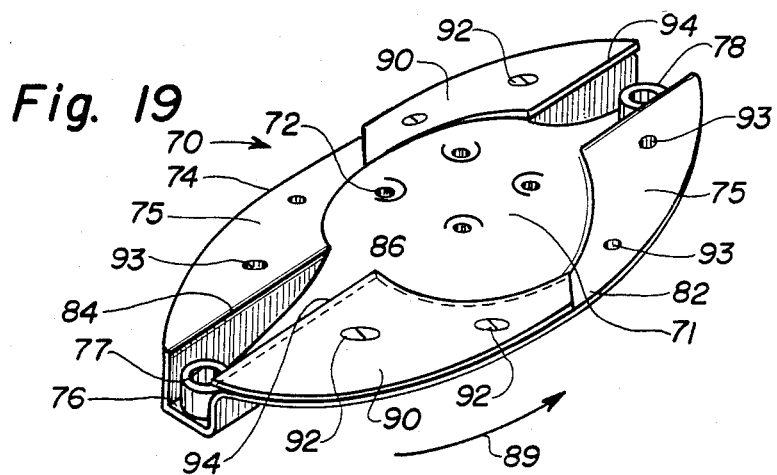
FIG. 19 is a perspective view of a disc cutter member similar to the view of FIG. 16 but with the ramp portions being equipped with replaceable wear members.
Figures 20, 21:
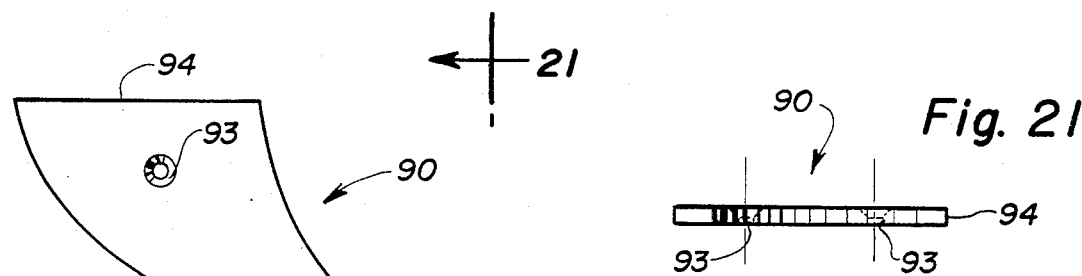
FIG. 20 is a top plan view of one of the wear members seen in FIG. 19.
FIG. 21 is a peripheral side elevational view of the wear member seen in FIG. 20, corresponding to lines 21—21.

As can be seen in FIGS. 19-24, the disc member 70 can be provided with wear plates 90 affixed to the leading lifting ramps 75, when viewed in the direction of rotation indicated by the arrow 89. As best seen in FIGS. 19-21, one embodiment of the wear plate 90 will comprise a pork-chop-shaped flat plate affixed to the leading lifting ramps 75 by fasteners 92 engaged with appropriate holes 94 formed in the lifting ramp 75. Since the leading ramp 75 will be subjected to the greatest amount of abrasive wear during operation of the disc member 70, the utilization of replaceable wear plates 90 will provide a greater economic and operative life for the disc member 70. As indicated above with respect to FIG. 18, the trailing edge 94 of the wear plate 90 would position the resulting trailing edge 84 of the lifting ramp 75 in substantially the same plane 73 as the raised central portion 71 of the disc member 70.

Figure 22:
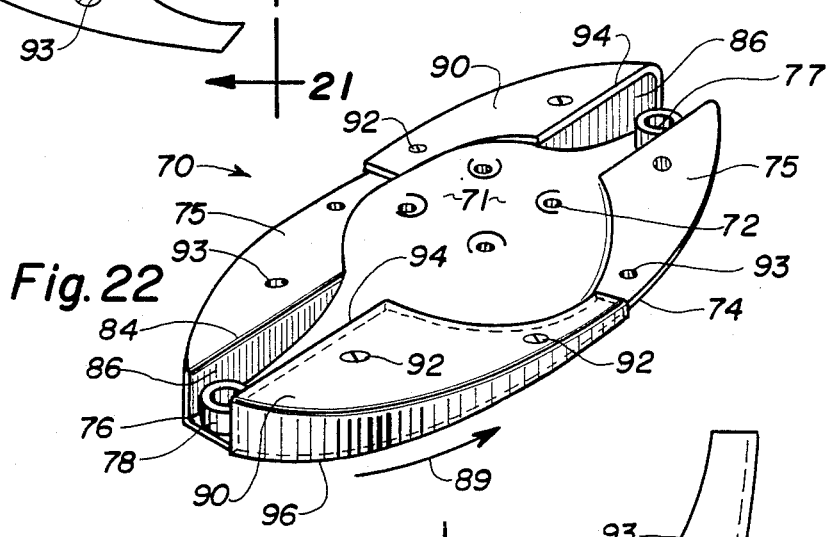
FIG. 22 is a perspective view of a disc cutter member similar to the view seen in FIG. 19, but with the ramp portions being equipped with an alternative embodiment of a replaceable wear member.
Figures 23, 24:
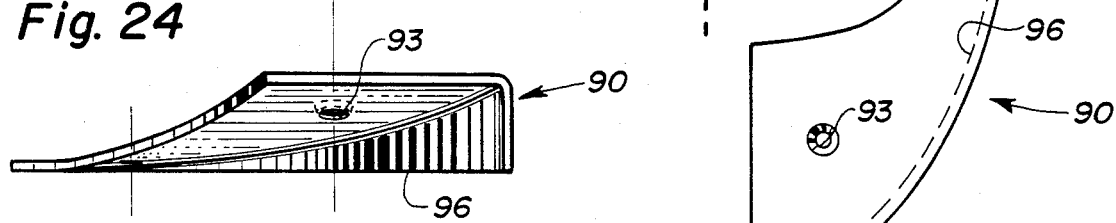
FIG. 23 is a top plan view of the wear member seen in FIG. 22.
FIG. 24 is a trailing side elevational view of the wear member corresponding to lines 24—24 of FIG. 23.

An alternative embodiment of the wear plate 90 can be seen in FIGS. 22-24. The wear plate 90 includes a generally vertically extending apron 96 positioned along the peripheral edge of the wear plate 90. The apron 96 would present a solid face to the severed crop material to be lifted by the ramps 75, upon rotation of the disc member 70 to prevent crop material and/or other debris from being jammed underneath the lifting ramp 75 and also to protect the vertical sides 86 of the trench portion 76 from abrasive wear.

It will be understood that changes in the details, material, steps and arrangement of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without department from the scope of the invention. Accordingly, the following claims are intended to protect the invention broadly as well as in the specific form shown.

Having thus described the invention, what is claimed is:

1. In a disc mower-conditioner having a mobile frame adapted for forward movement over the ground; rotary cutting means supported by said frame adjacent the ground to sever standing crop material, said rotary cutting means including a transverse cutterbar rotatably mounting a plurality of transversely spaced disc cutters, each said disc cutter having a pair of knives connected thereto for severing standing crop material by impact upon rotation of said disc cutters; crop conditioning means mounted generally rearwardly of said rotary cutting means to condition crop material severed by said disc cutters, an improved disc cutter comprising:
a raised central portion defining an upper plane;
a peripheral portion terminating in a circumferential peripheral edge;
a pair of knife mounting portions defining a lower plane below said upper plane, said knife mounting portions being disposed along said peripheral edge on opposing sides of said raised central portion; and
said peripheral portion adjacent said knife mounting portions being formed in an elevated edge on both circumferentailly opposing sides of each respective knife mounting portion, said peripheral edge sloping downwardly away from the respective said elevated edge circumferentailly toward the opposing knife mounting portion, forming depressed sections circumferentially midway between opposing knife mounting portions, said disc cutter having inclined ramps formed therein between each respective said depressed section and the corresponding elevated edges.

2. The disc mower-conditioner of claim 1 wherein said elevated edges are in substantially the same upper plane defined by said raised central portion.

3. The disc mower-conditioner of claim 2 wherein said depressed sections are in substantially the same plane as said knife mounting portions.

4. The disc mower-conditioner of claim 3 wherein each said inclined ramp in leading relationship with said knife mounting portions is provided with a detachably mounted wear plates.

5. The disc mower-conditioner of claim 4 wherein each said inclined ramp includes at least two openings therethrough cooperable with fastening means for detachably connecting said wear plates.

6. The disc mower-conditioner of claim 4 wherein each said wear plate includes a generally vertically extending apron terminating in a lower edge.

7. The disc mower-conditioner of claim 6 wherein said lower edge is in substantially the same plane as said depressed sections and said knife mounting portions.

8. The disc mower-conditioner of claim 7 wherein said inclined ramps extend substantially a quadrant of said peripheral edge.

9. A rotatable disc cutter for a rotary cutting mechanism operable to sever standing crop material by impact action, comprising:
a raised central portion defining an upper plane;
a peripheral portion terminating in a circumferential peripheral edge;
first and second knife mounting portions defining a lower plane spaced below said upper plane, said knife mounting portions being disposed adjacent said peripheral edge on opposing sides of said raised central portion; and
said peripheral portion adjacent said knife mounting portions being formed in an elevated edge on both circumferentially opposing sides of each respective knife mounting portion, said peripheral edge sloping downwardly away from the respective said elevated edge toward the opposing knife mounting portion, forming depressed sections circumferentially between opposing knife mounting portions, said peripheral portion being formed in inclined ramps extending between each respective said elevated edge and the corresponding depressed section.

10. The disc cutter of claim 9 wherein each said depressed section is positioned substantially circumferentially midway between opposing knife mounting sections.

11. The disc cutter of claim 10 wherein each said inclined ramp extends substantially a quadrant of said peripheral edge.

12. The disc cutter of claim 11 wherein said depressed sections are in substantially the same lower plane as said knife mounting portions.

13. The disc cutter of claim 12 wherein said elevated edges are in substantially the same upper plane as said raised central portion.

14. The disc cutter of claim 13 wherein each said inclined ramp in leading relationship to said knife mounting portions, when viewed in the direction of rotation of said disc cutter, is provided with a detachably mounted wear plate.

15. The disc cutter of claim 14 wherein each said elevated edge is slightly below said upper plane when the respective said wear plate is removed from said disc cutter.

16. The disc cutter of claim 15 wherein each said wear plate includes a generally vertically extending apron terminating in a lower edge, said lower edge being in substantially the same lower plane as said depressed sections and said knife mounting portions.

17. A disc cutter member for a rotary cutterbar in a disc mower-conditioner comprising:
a raised central portion defining an upper plane;
a peripheral portion terminating in a circumferentially extending peripheral edge defining an oval-shaped disc having major and minor axes;
first and second knife mounting portions defining a lower plane spaced below said upper plane, said knife mounting portions being located at circumferentially opposing positions along said major axis;
first and second depressed sections substantially positioned within said lower plane, said depressed sections being located at circumferentially opposing positions along said minor axis; and
inclined ramp portions formed within said peripheral portion and extending from each said depressed section toward each said knife mounting portion, each said inclined ramp portion having an elevated, generally radially extending edge adjacent each respective said knife mounting portion, each said elevated edge being substantially in said upper plane such that each said knife mounting portion is formed as a trench-like portion with generally vertical sides extending upwardly from said knife mounting portion to each adjacent elevated edge.

18. The disc cutter member of claim 17 wherein each said inclined ramp portion in leading relationship to each respective said knife mounting portion upon rotation of said disc cutter member has a wear plate detachably affixed thereto.

19. The disc cutter member of claim 18 wherein each said wear plate includes a generally vertically extending apron positionable adjacent the peripheral edge and extending downwardly to said lower plane.

20. The disc cutter member of claim 19 wherein each said knife mounting portion includes a collar within which connecting hardware for detachably fastening a corresponding knife can be positioned to protect the connecting hardware from abrasive wear, said collar having a height terminating below said upper plane.

* * * * *